UNITED STATES PATENT OFFICE.

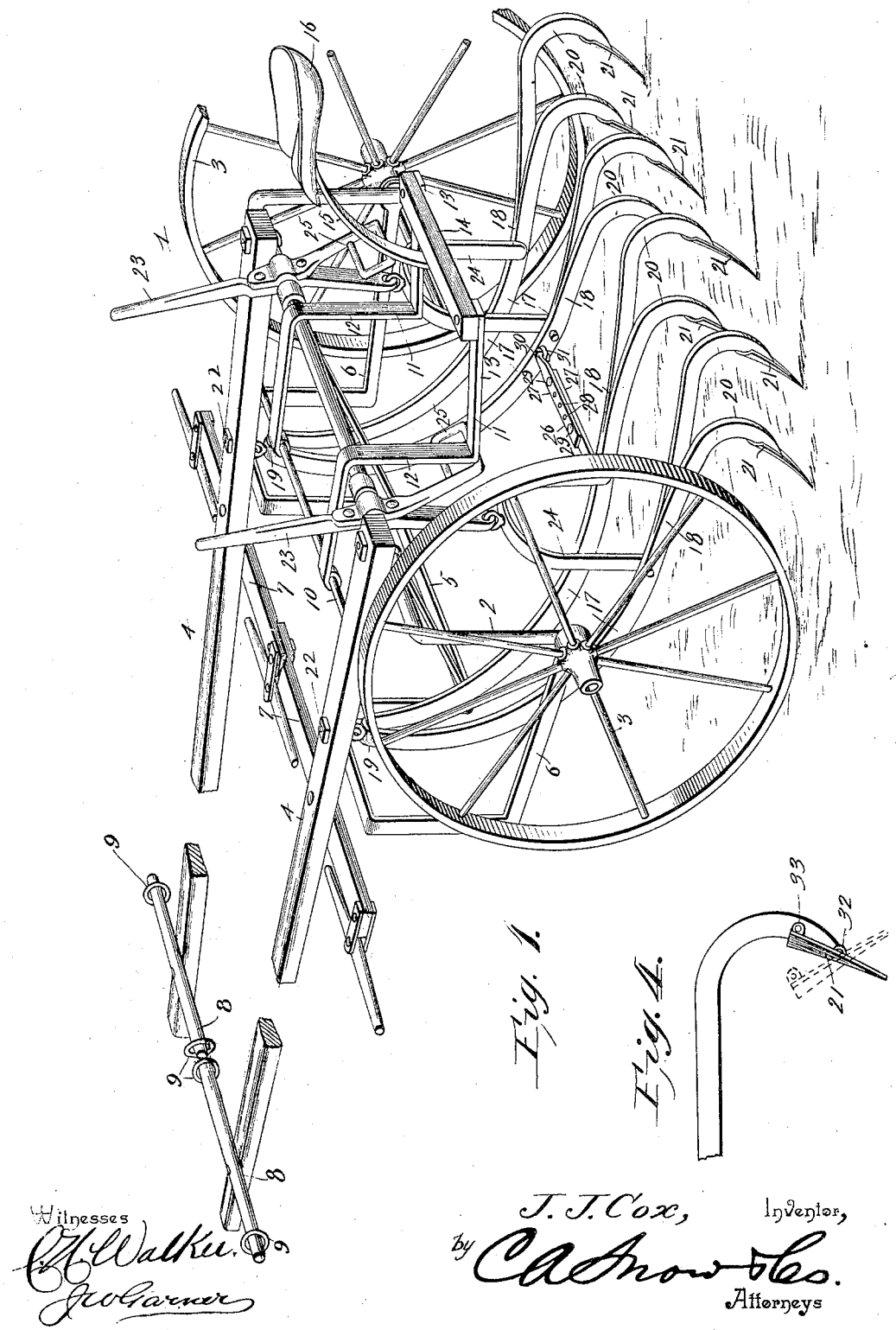

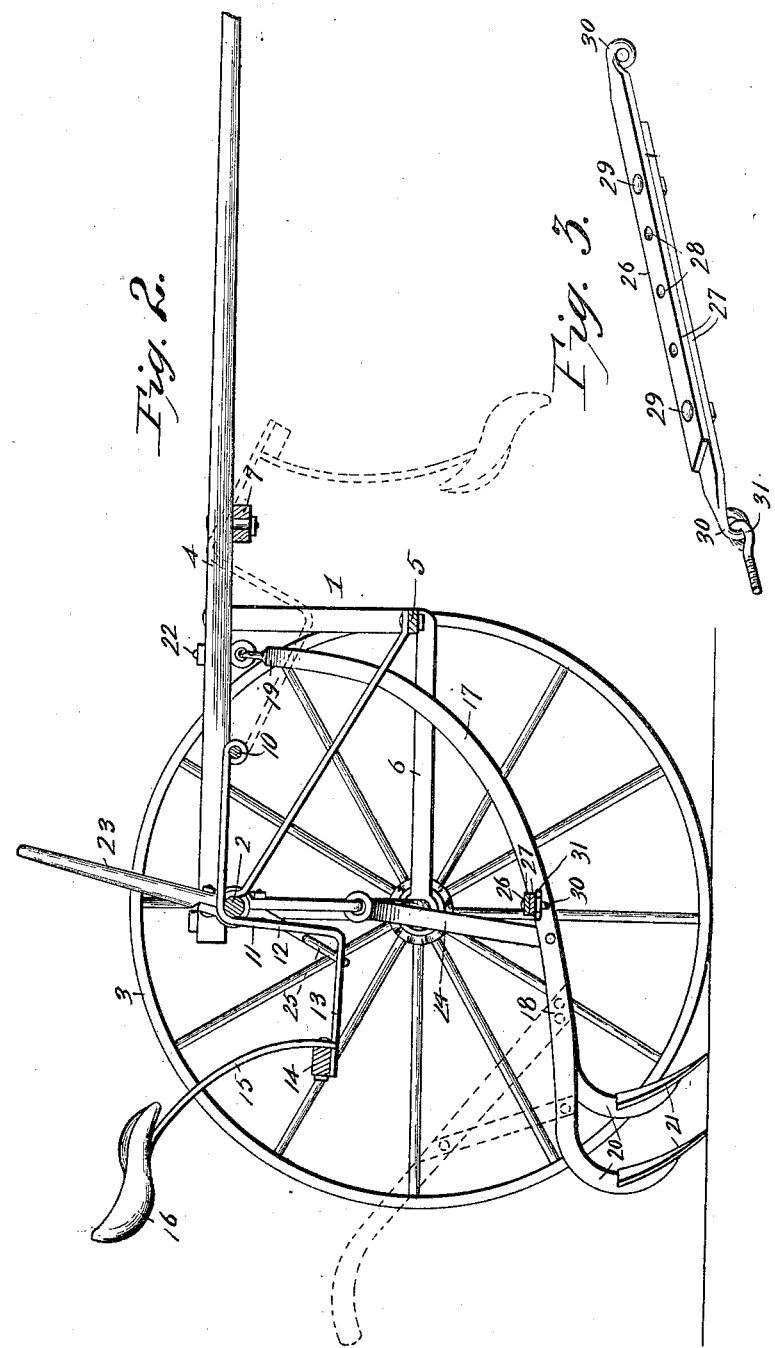

JOSHUA JACKSON COX, OF WRIGHTSVILLE, ILLINOIS.

CULTIVATOR.

SPECIFICATION forming part of Letters Patent No. 676,980, dated June 25, 1901.

Application filed November 21, 1900. Serial No. 37,287. (No model.)

*To all whom it may concern:*

Be it known that I, JOSHUA JACKSON COX, a citizen of the United States, residing in Wrightsville township, in the county of Greene and State of Illinois, have invented a new and useful Cultivator, of which the following is a specification.

My invention is an improved cultivator adapted for cultivating two rows of corn at once; and it consists in the peculiar construction and combination of devices hereinafter set forth, and pointed out in the claims.

One object of my invention is to provide a cultivator which is adapted to be used either as a riding or walking cultivator and in which the cultivator-frames may be shifted toward each other or from each other, as may be necessary, according to the width of the spaces between the rows, a further object of my invention being to provide means for raising and lowering the cultivator-frames at will.

In the accompanying drawings, Figure 1 is a perspective view of a cultivator constructed in accordance with my invention. Fig. 2 is a vertical longitudinal sectional view of the same. Fig. 3 is a detail perspective view of the longitudinally-adjustable link which connects the cultivator-frames. Fig. 4 is a detail view of one of the cultivator-standards and the shovel attached thereto.

The sulky 1 comprises the arched axle 2, the supporting-wheels 3 thereon, the draft poles or tongues 4, and the brace-bar 5, which connects said poles or tongues together and also connects them to the ends of the arched axle through the members or arms 6. Draft-equalizing bars 7 are pivoted to said poles or tongues near the rear ends thereof and are adapted for the attachment of the usual single-trees, one being attached at the outer end of the said draw-bars and the other connected to the inner ends thereof at a point midway between the draft poles or tongues. To front ends of the draft poles or tongues are attached neck-bars 8, on which are rings 9 or other suitable attachments for the holdback-straps, which are, as usual, attached to the collars of the draft-animals, and said neck-bars are so pivoted as to equalize the stress between the animals. It will be understood from the foregoing that three horses are employed for drawing my improved cultivator, one horse being disposed between the poles or tongues and walking between the rows in process of cultivation, the other horses being on the outer sides of the poles or tongues and walking on the outer sides of the said rows. A cross-bar 10 connects the poles or tongues at a suitable distance in advance of the arched axle, and to the said cross-bar are pivotally attached the front ends of rearward-extending supporting-bars 11, which rest on the arched axle and are bent downward in rear thereof, as shown at 12, and provided with rearward-extending horizontal arms 13, the rear ends of which are connected by a cross-bar 14, to which is secured the spring-bar 15, that supports the seat 16 for the driver. It will be understood from the foregoing that the bars 11 14 constitute a seat-supporting frame and that the said frame may be either disposed in rear of the arched axle, as hereinbefore described and as shown in Figs. 1 and 2, or it may be turned forward so as to fold the seat forward of the axle over the cross-bar 7, as indicated in dotted lines in Fig. 2.

In connection with the sulky-frame I employ a pair of cultivator-frames 17, which may be of any suitable construction and adapted for the attachment thereto of any suitable cultivator-plows or cultivator-disks. In the form of my invention here shown each of the said cultivator-frames comprises a pair of rearward-diverging beams 18, the front ends of which are curved upward and united, as at 19, and the rear ends of which are bifurcated to provide the pairs of standards 20 to which the cultivating-shovels 21 are attached. Each cultivator-frame has its front end flexibly connected to the under side of one of the draft poles or tongues, as by a pair of eye-bolts 22. Thereby said cultivator-frames may be raised or lowered or shifted laterally as may be required to adjust them to the width of the rows of corn.

On that portion of the arched axle between the draft poles or tongues are pivoted levers 23, which are adapted to be moved toward and from each other on the arched axle. The lower ends of the said levers are connected to the cultivator-frames by the inverted-U-shaped links 24, and it will be understood that by means of the said levers and links the cultivator-frames may be raised and lowered as may be required. Each of the said levers is provided with a pedal 25, which adapts the said levers to be operated by the feet of the driver.

The cultivator-frames are connected together by a link 26. The said link comprises a pair of bars 27, which are provided with adjusting-openings 28. Bolts 29 in the said adjusting-openings secure the said bars together and enable the link to be lengthened or shortened as may be required to adjust the cultivator-frames laterally either toward or from each other. The bars 27 are provided at their outer ends with eyes 30, which are engaged by eyebolts 31, that connect the ends of the link to the cultivator-frames.

If desired, each of the cultivator-frames may be provided with a handle, as indicated in dotted lines in Fig. 2, and thus the machine may be used as a walking-cultivator, the cultivator-frames being guided by a plowman by means of the said handles.

A cultivator thus constructed is exceedingly cheap and simple, is strong and durable, and may be operated by a single person. Being adapted to cultivate two rows of corn at once and to be drawn by three horses, a very considerable economy is realized in the cultivation of the crop as compared with the single-horse cultivators in common use, each of which requires a driver.

The cultivator-shovels 31 are pivoted to the standards of the cultivator-frames, as at 32, and are further secured thereto by break-pins 33. When the shovels strike unyielding obstructions, as rocks or roots, the pins 33 break, thereby permitting the shovels to turn on the pivots 32 and clear such obstructions without being injured.

Having thus described my invention, I claim—

1. In a cultivator, the combination of the sulky-frame, the cultivator-frames having their front ends flexibly connected thereto, a means connecting the said cultivator-frames together, whereby the same may be adjusted laterally toward and from each other, the levers adjustable laterally on their supports and connections between the said levers and the said cultivator-frames whereby the latter may be raised and lowered, substantially as described.

2. In a cultivator, the sulky-frame having the arched axle and draft-poles, the cultivator-frames having their front ends flexibly connected to the draft-poles, the levers mounted and adjustable on the arched axle toward and from each other, connections between the said levers and the said cultivator-frames, and means connecting the said cultivator-frames together whereby the same may be adjusted laterally toward and from each other, substantially as described.

In testimony that I claim the foregoing as my own I have hereto affixed my signature in the presence of two witnesses.

JOSHUA JACKSON COX.

Witnesses:
  B. W. GREER,
  W. A. HUBBARD.